March 5, 1968 — J. W. LEEPER — 3,371,755
BRAKE ADJUSTER

Filed June 21, 1966 — 2 Sheets-Sheet 1

INVENTOR.
JAMES W. LEEPER
BY Teagno and Toddy
ATTORNEYS

March 5, 1968  J. W. LEEPER  3,371,755
BRAKE ADJUSTER

Filed June 21, 1966  2 Sheets-Sheet 2

INVENTOR.
JAMES W. LEEPER
BY Teagno and Toddy
ATTORNEYS

United States Patent Office 3,371,755
Patented Mar. 5, 1968

3,371,755
BRAKE ADJUSTER
James W. Leeper, Philadelphia, Pa., assignor to Eaton Yale & Towne Inc., Cleveland, Ohio, a corporation of Ohio
Filed June 21, 1966, Ser. No. 559,244
3 Claims. (Cl. 188—196)

ABSTRACT OF THE DISCLOSURE

An automatic brake adjuster for cam operated vehicle brakes actuated by a lever arm. A spring biased bar is slideable on a housing attached to the arm, and brake lining wear is sensed by the bar by engagement with an abutment on the vehicle axle. The slide bar carries a spring biased pawl which actuates a ratchet wheel to change the relative position of the cam shaft upon release of the brakes.

---

This invention relates to an operating mechanism for vehicle brakes or various other devices, and more particularly to a slack adjusting device adapted to be embodied in such an operating mechanism.

Many trucks, buses, trailers and the like utilize power operated brake systems, the usual type employing for each wheel a cam acting between the free ends of floating brake shoes to spread apart said ends and urge the shoes into engagement with the rotating brake drum. Generally, such brakes are power operated by means of positive air pressure or a vacuum. The mechanical linkage usually consists of a fluid piston motor having an actuating rod extending therefrom which is connected to a suitable lever arm on the brake cam shaft. Such vehicles encounter brake lining wear particularly during prolonged use and undue heating of brake drums, to the general end that undue lost motion in the brake linkage system is prevalent. It is common to remove the lost motion in the brake linkage system by means of a slack adjuster. Said slack adjuster may be either of the manual operated or automatic type. A manual operated slack adjuster requires periodic service with a suitable tool or other means. In some vehicles the manual operated slack adjuster is undesirable because of the time and expense that the vehicle incurs during its down time. In other vehicles, such as fork lift trucks, space is a key consideration in the design of the truck. As a result, access to the brake adjusting mechanism is often difficult if not impossible. Automatic brake adjusters are therefore desirable to not only reduce the maintenance and down time of the vehicle but also to adjust the brakes in instances where access to the brake adjuster is limited.

An object of this invention, therefore, is to provide a slack adjusting device of simple and inexpensive construction which can be readily embodied in a linkage or mechanism for operating vehicle brakes or other devices, and which will serve efficiently for automatically taking up slack in such operating linkage or mechanism.

It is an additional object of this invention to provide a slack adjusting mechanism incorporating means therein to positively sense overtravel of the linkage operating vehicle brakes or other devices, and compensate for said overtravel.

It is a further object of this invention to provide a slack adjusting mechanism suitable for vehicle brakes of the opposed friction shoe type.

It is a further object of this invention to provide a slack adjusting mechanism for vehicle brakes of the S-cam type.

It is a still further object of this invention to provide a slack adjusting mechanism that is compatible with S-cam brakes and may be readily secured to the operating linkage of S-cam brakes.

It is a still further object of this invention to provide a slack adjuster that is of simplified but yet reliable construction.

To the accomplishment of the foregoing and related ends, such invention then consists of the means hereafter fully described and particularly pointed out in the appended claims, the following description and annexed drawings setting forth in detail certain illustrative embodiments of the invention, such disclosed means constituting, however, but a few of the various forms in which the principle of this invention may be employed.

The present invention may be better understood by referring to the annexed drawings which are illustrative of a preferred embodiment of the present invention, and wherein.

Figures 1, 2, 3, 4:
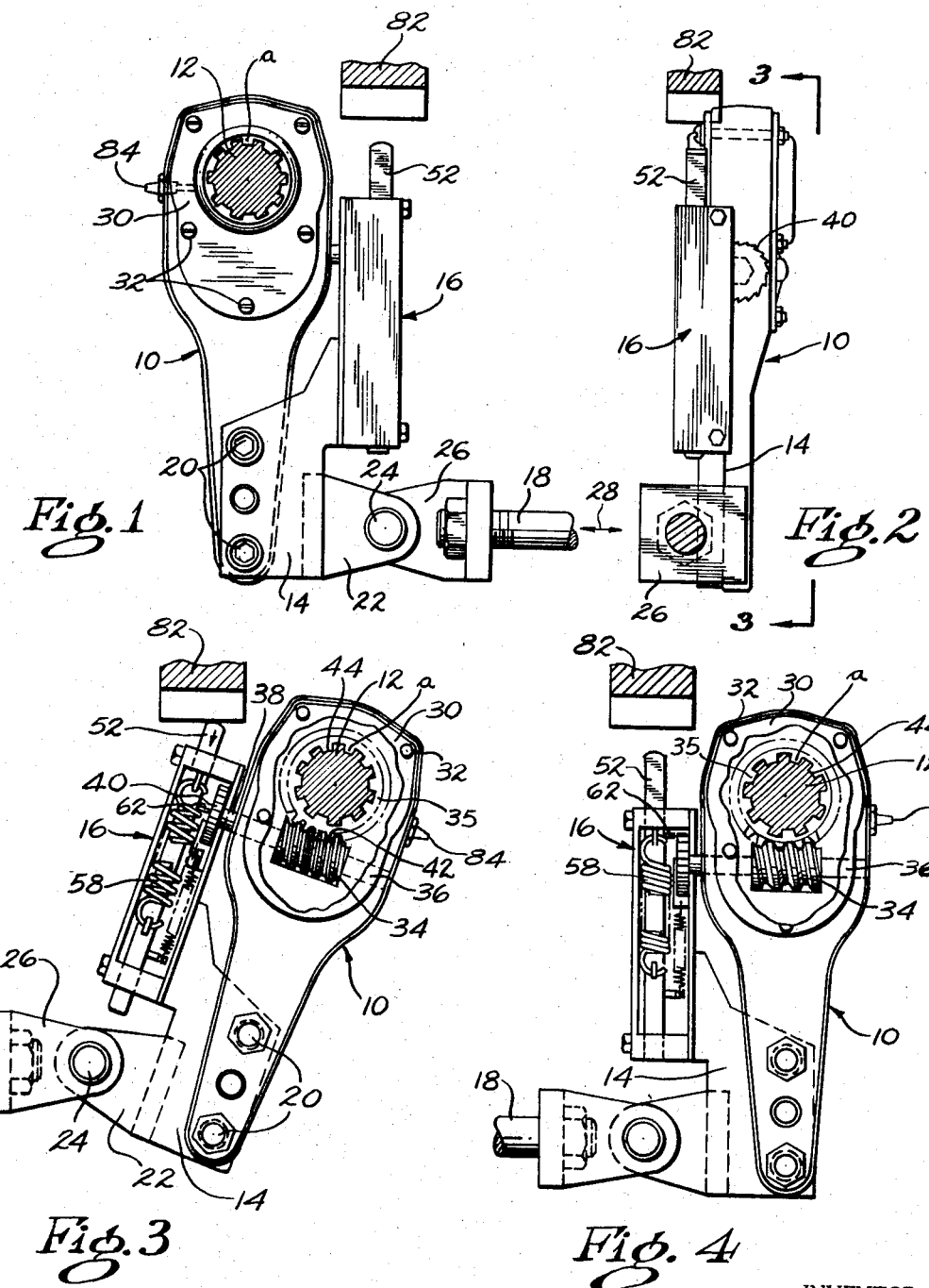
FIGURE 1 is an elevational view partly in section showing an operating mechanism or linkage embodying a slack adjusting device according to this invention.
FIGURE 2 is a side perspective view partly in section showing the operating mechanism or linkage embodying a slack adjusting device constructed according to this invention.
FIGURE 3 is a front elevational view partly in section of the operating mechanism or linkage embodying the slack adjusting device of this invention, said linkage or operating mechanism in a position immediately prior to adjustment taking place.
FIGURE 4 is a front elevational view partly in section of the operating mechanism or linkage embodying the slack adjuster of this invention in an operating position immediately after adjustment has taken place.

Referring now to the embodiment of the invention illustrated and particularly FIGURES 1 and 2 of the drawings, a novel and improved automatic adjusting mechanism is shown operatively associated with a conventional S-cam brake linkage. Thus there is shown in FIGURES 1 and 2 a lever arm or housing 10 operatively secured to a cam shaft 12. On one end of housing 10 there is secured thereto a bracket 14 which bracket serves to mount the automatic slack adjuster 16 of this invention as well as provide means to connect an operating linkage 18 to the housing 10. Said bracket 14 is secured to housing 10 by means of fasteners 20 or other suitable connecting means. Bracket 14 may include a connecting link 22 welded or otherwise secured to the bracket. Secured to one end of the connecting link 22 is an operating link 26. Links 22, 26 may be interconnected by means of a pivot pin 24. Thus it is to be understood that movement of the operating linkage 18 in the direction of arrow 28 is effective to rotate housing 10 and thus the cam shaft 12 to thereby bring a cam in contact with the floating ends of opposed brake shoes.

In FIGURE 3, a cut away view of the lever arm or housing element 10 is shown. The housing 10 thus includes a cover plate 30 secured to said housing by means of fasteners 32. A worm 34 is rotatably mounted within the housing 10 by means of a worm adjusting shaft 36. Each end of the worm adjusting shaft is suitably received in bearing supports in the housing 10. An extension 38 on the worm adjusting shaft 36 protrudes through the housing 10 and secured to said extension is a ratchet wheel 40. Also rotatably disposed within the housing 10 is a worm gear 35. Said worm gear 35 includes external gear teeth 42 to mate with the complementary worm 34. Defined in the interior portion of the worm gear 35 are splines 44 complementary to similar splines on the exterior surface of the cam shaft 12.

Thus it is to be understood that the cam shaft 12 and the worm gear 35 are retained in non-rotatable relationship by means of splines 44. As will be more clearly shown, however, the relative position of the worm gear 35 and cam shaft 12 with respect to the housing 10 may be changed by means of rotation of the worm 34. As will be more fully described, rotation of the worm 34 is accomplished by means of the brake adjuster mechanism 16 which serves to rotate the ratchet wheel 40 and thus the worm 34.

Figure 5:
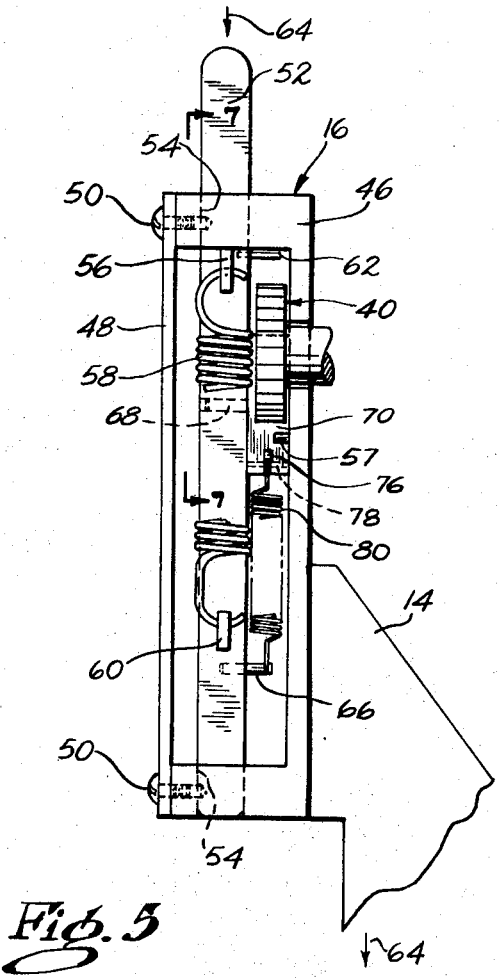
FIGURE 5 is a front elevational view, with parts thereof broken away, of the automatic slack adjuster mechanism of this invention and the slidebar of the slack adjuster in a normal position.
Figure 6:
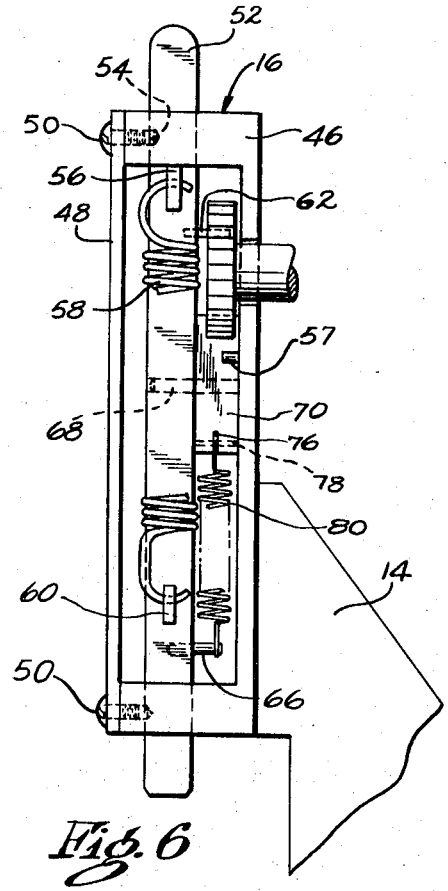
FIGURE 6 is a front elevational view, with parts broken away, of the brake adjuster of this invention and with the slidebar thereof in a retracted position.

Attention is now directed to FIGURE 5 wherein there is shown a more detailed view of the brake adjuster mechanism 16. Brake adjuster mechanism 16 comprises an adjuster housing 46 suitably connected to bracket 14 by means of welding or other means well known in the art. Secured to adjuster housing 46 by means of fasteners 50 is an adjuster cover 48. Said cover 48 may be either of L-shaped construction or U-shaped construction to either partially or fully enclose the interior of the adjuster housing 46.

The adjuster mechanism itself includes a slidebar 52 received in slots or other suitable guideways 54 in the adjuster housing 46. Depending from the adjuster housing 46 is a projection 56 having a hole therein to receive one end of the slidebar spring 58. The other end of slidebar spring 58 is received in a hole in projection 60 of slidebar 52. It is thus to be understood that the slidebar 52 is free to reciprocate in guideways 54 within the adjuster housing 46. Slidebar spring 58 serves to continually outwardly bias the slidebar 52 out of the adjuster housing 46. A stop pin 62 may be provided in the slidebar 52 to abut the adjuster housing 46 and thus limit the outward movement of slidebar 52 from adjuster housing 46. It is to be understood, therefore, that should slidebar 52 move in the direction of arrow 64, FIGURE 5, that slidebar spring 58 will thereby become elongated. After the moving force on the slidebar 52 is removed, the slidebar spring 58 will cause the slidebar to return to its initial position with stop pin 62 abutting the interior wall of adjuster housing 46.

Also depending from the slidebar 52 is a spring pin 66 and a pawl pin 68. Both the spring pin 66 and pawl pin 68 are suitably retained in bores of the slidebar 52. A pawl 70 is carried by pawl pin 68 and is free to rotate or pivot about pawl pin 68. As is more clearly shown in FIGURE 7 the pawl 70 includes a ratchet wheel engaging portion 72 to contact teeth 74 on ratchet wheel 40. Said pawl 70 also includes a cut-out portion 76 at the lower end thereof which cut-out portion is bridged by a suitable pin 78. A pawl spring 80 has one end thereof hooked to the pin 78 and the other end hooked about the spring pin 66.

It is therefore to be understood that the pawl 70 and pawl spring 80 are carried by the slidebar 52 and reciprocate with said slidebar 52. The pawl spring 80 serves to continually bias the ratchet wheel engaging portion 72 of the pawl 70 into engagement with ratchet wheel 40.

Figure 7:
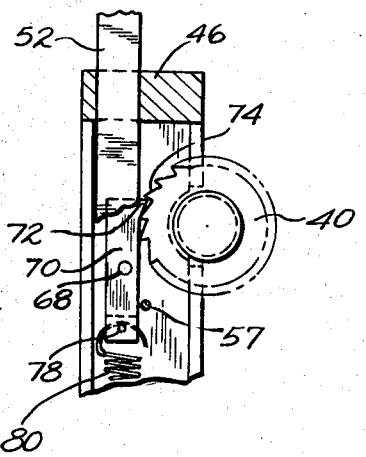
FIGURE 7 is a sideview partly in section of a portion of the automatic adjuster of this invention showing the engagement of the pawl mechanism and the ratchet wheel.

Considering FIGURE 7, it may be seen that as slidebar 52 is moved in the downward direction of arrow 64, pawl 70 carried by the slidebar 52 will likewise move in a downward direction. Because of the orientation of the teeth 74 on the ratchet wheel 40, the ratchet wheel engaging portion 72 of the pawl 70 is free to slip past the teeth 74 as the pawl moves downwardly. The pawl spring 80, however, serves to continuously bias the ratchet wheel engaging portion 72 into the teeth 74. On the downward stroke of slidebar 52, therefore, the pawl 70 will slip past the teeth 74 of the ratchet wheel without causing the ratchet wheel 40 to rotate. On the upward stroke of the slidebar 52, the orientation of the teeth 74 of the ratchet wheel 40 will not allow the ratchet wheel engaging portion 72 to slip past the several teeth 74. Therefore, upward movement of the pawl 70 is effective to rotate the ratchet wheel 40 as the ratchet wheel engaging portion 72 abuts a single tooth 74. As was previously pointed out rotation of the ratchet wheel 40 serves to rotate the worm 34 which in turn rotates the worm gear 35 to thus change the relative position of the cam shaft 12 with respect to the housing 10.

The operation of the adjuster mechanism 16 in a complete braking system will now be described. As was previously pointed out the operating linkage 18, FIGURE 1, may be reciprocated in the direction of arrow 28 by means of a suitable motor (not shown). Reciprocation of the linkage 18 is effective to rotate the housing 10 about the axis of the cam shaft 12. During normal braking operation, with new brake shoes installed, the housing 10 must rotate over a given amount of arc to cause the brake shoe engaging cam to fully expand the brake shoes into contact with the rotating drum. As the brake lingings wear, however, the housing 10 must be rotated over a greater amount of arc in order to bring the brake shoes into contact with the rotating drum. The automatic adjuster mechanism of this invention is sensitive to this increased rotation of the housing or overtravel of the linkage mechanism. Considering FIGURE 3, an abutment 82 is provided either on the vehicle axle or the vehicle body in such a position that overtravel of the housing 10 will cause the slidebar 52 to contact the abutment 82. It is to be understood that without brake lining wear, rotation of the housing 10 is not so great as to cause the slidebar 52 to contact the abutment 82. It is only when the linings have worn to a sufficient degree, and the amount of the rotation of the housing 10 increases during brake application, that the slidebar 52 will contact the abutment 82. As shown in FIGURE 3, contact of the slidebar 52 and the abutment 82 is effective to depress the slidebar 52 downwardly as shown by the arrow. As was previously pointed out, a downward movement of the slidebar is effective to carry the pawl 70 in a downward direction past one or more teeth 74 on the ratchet wheel 40. As the brakes are released and the housing 10 rotates to the position of FIGURE 4, the slidebar 52 returns to its initial position under the influence of the slidebar spring 58. As was previously pointed out, an upward movement of the slidebar 52 is effective to cause the pawl engaging portion 72 to engage a single tooth 74 of the ratchet wheel 40 and rotate the ratchet wheel 40. Of course the amount of rotation of the ratchet wheel 40 is dependent upon the amount of linear travel of the slidebar 52 as well as the spacing of teeth 74. Rotation of the ratchet wheel 40 is thus effective to rotate the worm 34 which in turn rotates the worm gear 35. Rotation of the worm gear 35 thus changes the relative position of the cam shaft 12 with respect to the housing 10. This change in relative position of the cam shaft 12 and the housing 10 may be seen by comparing FIGURES 1 and 4. In FIGURE 1 a particular spline labeled *a* on the worm gear 35 is shown. After rotation of the ratchet wheel 40 during a brake adjusting instance, the spline element *a* may be seen in FIGURE 4 as slightly displaced in a clockwise direction from that shown in FIGURE 1. Thus the cam shaft 12 and the brake shoe engaging cam (not shown) have been displaced in a clockwise direction relative to the housing 10. Therefore the slack in the brake operating linkage caused by wear of the brake lining has been effectively compensated by the change in relative position of the cam shaft 12 and the housing 10.

It may be seen from an examination of FIGURES 3 and 4 that the slidebar spring 58 must be of such a size and spring constant as to effectively displace the slidebar 52 in an upward direction as well as overcome the friction in the worm gear 35 and mating worm 34 to turn the ratchet wheel 40 to effect a brake adjustment. The pawl spring 80 is considerably smaller than the slidebar spring 58 and need only have a spring constant sufficient to maintain the pawl 70 in engagement with the teeth 74 of the ratchet wheel 40.

As shown in FIGURE 1, lubrication of the worm gear 35 and mating worm 34 may be accomplished by means of a lubricating point 84 in the housing 10.

As was previously pointed out, stop pin 62 serves to limit the upward extent of slidebar 52. Similarly spring pin 66 serves to limit the downward extent of the slidebar as said pin abuts the lower interior surface of adjuster housing 46. In actual operation, however, as brake linings wear relatively slowly, the downward travel of slidebar 52 will not be so great that pin 66 abuts housing 46. As a convenience, a projection 57 may be provided on the interior of the housing 46 to insure that pawl 70 does not fall out of alignment with ratchet teeth 74 during extreme movement of the slidebar as during installation or manual adjustment of the brakes. Thus projection 57 insures that pawl 70 will always exert a rotational force on the ratchet wheel 40 by engaging teeth 74 immediately adjacent the slidebar and, thus, not fall into a position of dead center with respect to the ratchet wheel axis by engaging lower teeth.

It is to be understood that during installation of the brake system or relining of the shoes thereof, manual adjustment may be performed by depressing slidebar 52 any required number of times to thus change the relative position of the cam and the housing.

The brake adjusting mechanism of this invention is effective to make an adjustment each time the slidebar 52 contacts the abutment 82 and the ratchet wheel engaging portion 72 of the pawl 70 slips into engagement with an adjacent tooth 74. Adjustment of the brake takes place each time the slidebar 52 is depressed at least a sufficient amount to cause the ratchet wheel engaging portion 72 of the pawl 70 to engage an adjacent tooth. The adjustment actually takes place on the return stroke, as the slidebar 52 is displaced out of the housing 46 of the adjuster mechanism under the influence of the slidebar spring 58. Adjustment may take place with each brake application until the relative position of the cam shaft 12 has been changed with respect to the housing 10 so that the slidebar 52 does not contact the abutment 82 during a brake application.

From the foregoing description and accompanying drawings it will now be seen that there has been provided a slack adjusting mechanism of simple and economical construction which can be readily embodied in mechanisms or linkages for operating vehicle brakes or other devices. It will be seen further that the simplicity of this slack adjusting device and its efficiently and reliability of operation are due largely to the fact that the device utilizes a pawl and ratchet wheel in conjunction with a detent means. Engagement of the detent and a suitable abutment provides a positive and reliable indicator of overtravel of the lever during periods of brake lining wear.

Having thus described my invention, I claim:
1. An automatic slack take-up and clearance-adjustment mechanism for a wheeled vehicle employing axle mounted cam-operated brakes which employ in linkage an actuating rod and lever connected with a cam shaft for spreading the ends of brake shoes apart comprising:
   a vehicle axle having an abutment surface thereon,
   a housing defining a lever arm,
   a worm within said housing, said worm mounted on an adjusting shaft rotatably mounted in said housing,
   a worm gear rotatably mounted in said housing and engaging said worm, said worm gear fixed in nonrotating relationship to the brake shoe engaging cam shaft by means of interengaging splined surfaces on said cam shaft and said worm gear,
   means to automatically adjust the worm gear relative to said housing comprising;
   a ratchet wheel mounted on said adjusting shaft,
   detent means depending from said housing comprising,
   a slide bar projecting into a pair of aligned guide holes in said housing and having both ends thereof extending outwardly from said housing when the slide bar engages said abutment surface,
   a slide bar return spring having one end thereof secured to said slide bar and the other end thereof secured to said housing to outwardly bias said slide bar through one of said guide holes,
   a pawl pivotally carried by said slide bar by means of a pawl pin carried by said slide bar,
   a pawl spring having one end thereof secured to said slide bar and the other end thereof secured to said pawl to thereby bias said pawl into engagement with said ratchet wheel,
   stop means on said slide bar to limit the extent of travel of said slide bar in said guide holes,
   whereby upon overtravel of said lever arm during brake application, said detent will abut said abutment surface and cause said pawl to ride up said ratchet wheel an amount proportional to the degree of overtravel of said lever arm and upon brake release said pawl will return to its original position under the influence of said slide bar return spring while rotating said ratchet wheel and thus compensate for brake lining wear.

2. The automatic slack take-up and clearance adjustment mechanism of claim 1 in which said stop means is further defined by a pin carried by said slide bar to abut the interior surface of said housing and thereby limit the outward movement of said slide bar.

3. An automatic slack take-up and clearance adjustment mechanism as claimed in claim 1, in which said aligned holes and slide bar lie in a plane axially outwardly of said ratchet wheel.

References Cited
UNITED STATES PATENTS 3,121,478   2/1964   Bostwick _____ 188—79.5

DUANE A. REGER, *Primary Examiner.*